US012266336B2

(12) United States Patent
Yeh et al.

(10) Patent No.: US 12,266,336 B2
(45) Date of Patent: Apr. 1, 2025

(54) EARPHONE DEVICE, COMPENSATION METHOD THEREOF AND COMPUTER PROGRAM PRODUCT

(71) Applicant: Rehear Audiology Company Ltd., Taipei (TW)

(72) Inventors: Ming-Han Yeh, Taipei (TW); Ying-Hui Lai, Taipei (TW)

(73) Assignee: REHEAR AUDIOLOGY COMPANY LTD., Taipei (TW)

( * ) Notice: Subject to any disclaimer, the term of this patent is extended or adjusted under 35 U.S.C. 154(b) by 162 days.

(21) Appl. No.: 17/968,238

(22) Filed: Oct. 18, 2022

(65) Prior Publication Data

US 2024/0021186 A1 Jan. 18, 2024

Related U.S. Application Data

(60) Provisional application No. 63/389,478, filed on Jul. 15, 2022.

(30) Foreign Application Priority Data

Jul. 29, 2022 (TW) ................................ 111128621

(51) Int. Cl.
*G10K 11/16* (2006.01)
*G10K 11/178* (2006.01)
*H04R 1/10* (2006.01)

(52) U.S. Cl.
CPC ..... *G10K 11/17854* (2018.01); *H04R 1/1016* (2013.01); *H04R 1/1083* (2013.01);
(Continued)

(58) Field of Classification Search
CPC ..... G10K 11/17854; G10K 2210/1081; G10K 2210/3028; G10K 2210/3056;
(Continued)

(56) References Cited

U.S. PATENT DOCUMENTS

2014/0126756 A1 5/2014 Gauger, Jr.
2014/0294191 A1* 10/2014 Parkins .................. A61F 11/06 381/72

(Continued)

OTHER PUBLICATIONS

Extended European Search Report issued Dec. 12, 2023 in European Application No. 23182326.1.

*Primary Examiner* — Ammar T Hamid
(74) *Attorney, Agent, or Firm* — Sughrue Mion, PLLC

(57) ABSTRACT

An earphone device is provided and includes: a wireless or wired transceiver module configured to receive a first electrical signal from an electronic device via a wireless or wired transmission network; a first compensation module connected to the wireless or wired transceiver module and arranged in a streaming audio gain compensating filter of an active noise cancellation chip, where the first compensation module is used to implement a frequency response curve to calculate a frequency response of the first electrical signal in each frequency band, and to generate a first filter parameter of a target frequency response curve via a first compensation gain conversion model, so that the first filter parameter gain compensates the first electrical signal in each of the frequencies; and a first transducer connected to the first compensation module to convert the first electrical signal gain compensating into sound and then transmit the sound. Further, a compensation method of the earphone device and a computer program product for implementing the compensation method are also provided.

15 Claims, 10 Drawing Sheets

(52) U.S. Cl.
CPC ................ *G10K 2210/1081* (2013.01); *G10K 2210/3028* (2013.01); *G10K 2210/3056* (2013.01); *H04R 2420/07* (2013.01); *H04R 2460/01* (2013.01)

(58) Field of Classification Search
CPC H04R 1/1016; H04R 1/1083; H04R 2420/07; H04R 2460/01
USPC ................................................ 381/71.6, 71.1
See application file for complete search history.

(56) References Cited

U.S. PATENT DOCUMENTS

2019/0246217 A1 8/2019 Miller et al.
2021/0377659 A1* 12/2021 Horbach .............. G10K 11/178

* cited by examiner

EARPHONE DEVICE, COMPENSATION METHOD THEREOF AND COMPUTER PROGRAM PRODUCT

BACKGROUND

1. Technical Field

The present disclosure relates to an audio compensation technology, and more particularly, to an earphone device with real-ear measurement (REM) analysis, which automatically compensates the gain in each frequency band, and a compensation method thereof, and a computer program product.

2. Description of Related Art

From the early days when it was almost unimaginable to enjoy music anywhere and at any time, to the fact that people can now be seen wearing earphones everywhere on the street to answer a wireless phone call or listen to music, there has been a marked shift in the way music is heard.

With the advancement of semiconductor and wireless communication technology and the evolution of entertainment media, music has gradually become an important part or an inseparable part of everyone's life, and the dimension/volume of music player has become more and more compact, which also drives drastic changes in the terminal sound-emitting elements. From the old way of listening to music with a speaker at a fixed point, to the new way of listening to music with earphones, there are various options for listening to music nowadays, and the most convenient way to listen to music is through earphones.

With the continuous evolution of earphones, a variety of different internal driver units have also been developed. Although there have been no major changes in the underlying principle, the structures for generating sound are actually quite different, and each type of sound generating structure has its own developing background, but also has its own advantages and disadvantages.

Previous studies have pointed out that different gains of frequency response used by an audio processing chip would directly affect the user's experience of listening to music. At present, the gain adjustment of the frequency response of true wireless stereo (TWS) earphones all uses the digital signal processing (DSP) unit to perform the gain compensation processing of each frequency band, and the precision of the frequency adjustment are affected by the sampling frequency of the DSP unit (that is, the higher the sampling rate, the finer or the more precise the frequency adjusting ability). However, when the sampling rate is increased, the power consumption of the DSP chip is also increased, such that the user's usage time under the same battery power is greatly reduced.

Furthermore, the acoustic measurements performed on a human's real ear may all be referred to as real-ear analysis or real-ear measurement. The generalized definition of real-ear test refers to the acoustic measurement performed on the human's real ear, and the narrow definition of real-ear test refers to the probe insertion measurement performed in the real ear near the tympanic membrane or eardrum (where the tip of the probe is about 5 mm away from the tympanic membrane). In the field of hearing aids (e.g., the acoustic measurement performed around the intervention gain in the real ear near the tympanic membrane), although the real-ear measurement is aimed at hearing-impaired people wearing hearing aids, the shape and structure of each person's ears are different. The real-ear measurement method is also suitable for today's earphone devices to confirm how much sound can really be heard in the ear canal and the audio quality in the ear canal.

In addition, the measured real-ear response often does not match the result expected by the fitting software, which mainly because the acoustic properties (e.g., resonance, volume, impedance, etc.) of the user's outer ear and inner ear may differ from the "average ear" data used in the software predictions. When conducting the real-ear measurement, the user's unique ear canal characteristics will be manifested and result in errors. Furthermore, the acoustic parameters of the user's earphone device, such as the size of the air pore or the depth of the tympanic membrane, are different. Therefore, the real-ear measurement requires additional gain adjustment to match the specified or expected target gain. Furthermore, insertion gain measurement is a common method for verifying the performance characteristics of earphone devices. However, as mentioned above, the insertion gain has many limitations in the tuning of the earphone device, resulting in errors.

In other words, if an active noise cancellation (ANC) framework is used to adjust the compensation gain, it is conventionally necessary to adjust multiple filters (e.g., filter type, fc, fc1, Q) or filter coefficients (e.g., $b_0$, $b_1$, $b_2$ . . . $a_0$, $a_1$ . . . ) to obtain the frequency response to achieve gain compensation. However, if the frequency response is obtained via adjusting multiple filters, the filter type, fc, fc1, Q and other parameters will need to be determined and adjusted manually. The multiple filters will mutually affect gain compensation, resulting in the problem of inefficiency. If the frequency response is obtained via adjusting the filter coefficients (for example, eight sets of filters), there will be a very high dimension that needs to be adjusted, making the filter coefficients hard to be quickly and accurately set.

In addition, although the feedforward filter (FF) and the feedback filter (FB) used in the present active noise cancellation chip are both dealing with the cancellation of ambient noise, the streaming audio filter (e.g., S(z) filter) and the transparency audio filter (e.g., APT filter), however, are not used in the present active noise cancellation chip to perform frequency response gain compensation for audio.

The above are some of the main problems encountered in the current technical field. Accordingly, in view of the above reasons, how to provide an earphone device and a compensation method thereof that do not need a real-ear analyzer and a probe transducer (i.e., a probe microphone), do not need to be limited to a professional hearing space (such as an audiometric testing room) for conducting the real-ear measurement analysis and do not need the assistance of professionals (such as professional tuners) for effectively solving the abovementioned problems and for effectively reducing the power consumption and the latency of the DSP chip, where the earphone device and the compensation method thereof that can provide accurate, real-time, automated and customized earphone devices (e.g., hearing devices or equipment such as commercially available earphones, ANC earphones, TWS earphones, hearing aids, auditory aids, or earphones and glasses with hearing aid functions, etc.) for users in the current real environment and how to greatly reduce the dimensions that need to be adjusted to quickly and accurately set filter coefficients have become an urgent issue for the industry to solve.

SUMMARY

In view of the aforementioned shortcomings of the prior art, the present disclosure provides an earphone device, which comprises: a wireless or wired transceiver module configured to receive a first electrical signal from an electronic device via a wireless or wired transmission network; a first compensation module connected to the wireless or wired transceiver module and arranged in a streaming audio gain compensating filter (i.e. S(z) filter) of an active noise cancellation chip, wherein the first compensation module is used to implement a frequency response curve to calculate a frequency response of the first electrical signal in each frequency band, and to generate a first filter parameter of a target frequency response curve via a first compensation gain conversion model, so that the first filter parameter gain compensates the first electrical signal in each of the frequencies; and a first transducer connected to the first compensation module and/or the wireless or wired transceiver module, wherein the first transducer converts the gain-compensated first electrical signal into a sound when enabling a compensation function, so as to transmit the sound, and directly converts the first electrical signal into a sound when disabling the compensation function, so as to transmit the sound.

The present disclosure further provides a compensation method of an earphone device, the compensation method comprises: receiving a first electrical signal from an electronic device via a wireless or wired transceiver module through a wireless or wired transmission network; when enabling a compensation function arranging a first compensation module connected to the wireless or wired transceiver module in a streaming audio gain compensating filter of an active noise cancellation chip, wherein the first compensation module is used to implement a frequency response curve to calculate a frequency response of the first electrical signal in each frequency band, and to generate a first filter parameter of a target frequency response curve via a first compensation gain conversion model, and wherein the first filter parameter gain compensates the first electrical signal in each of the frequencies; and converting the gain-compensated first electrical signal into sound and transmitting the sound via a first transducer connected to the first compensation module.

In one embodiment, when disabling the compensation function, the first electrical signal is directly converted into a sound via a first transducer connected to the wireless or wired transceiver module, so as to transmit the sound.

In one embodiment, the present disclosure further comprises a second compensation module connected to the wireless or wired transceiver module and arranged in a transparency audio gain compensating filter of the active noise cancellation chip, wherein the second compensation module is used to implement a voice gain compensation to calculate a gain of the second electrical signal in each frequency band, and to generate a second filter parameter via a second compensation gain conversion model, so that the second filter parameter gain compensates the second electrical signal in each of the frequencies.

In one embodiment, the target frequency response curve is a Harman frequency response curve, an Etymotic frequency response curve, a head-related transfer function frequency response curve, or other target frequency response curves that can achieve the same or similar.

In one embodiment, the first filter parameter is a filter parameter of a gain compensation in each of the frequencies of active noise cancellation, and the first filter parameter of the gain compensation in each of the frequencies of active noise cancellation is an audio gain compensation filter unit parameter.

In one embodiment, the present disclosure further comprises a storage module, wherein the first compensation module stores the first filter parameter to the storage module.

In one embodiment, the present disclosure further comprises: a second transducer connected to the first compensation module, wherein the second transducer receives a first test signal from the electronic device and converts the first test signal into a third electrical signal; and a third transducer connected to the wireless or wired transceiver module, wherein the third transducer synchronously converts the transmitted sound into a fourth electrical signal, so as to transmit the fourth electrical signal to the electronic device via the wireless or wired transmission network.

In one embodiment, the electronic device receives the fourth electrical signal from the third transducer via the wireless or wired transmission network, a third compensation module calculates a frequency response of the fourth electrical signal in each frequency band and compares a deviation between the frequency response and the target frequency response curve, wherein the electronic device quantizes the deviation to generate a third filter parameter via a third compensation gain conversion model when the deviation does not conform with a deviation target, and wherein the third filter parameter gain compensates the fourth electrical signal in each of the frequencies, so that the third filter parameter is transmitted to the first compensation module via the wireless or wired transmission network for gain compensation.

In one embodiment, the present disclosure further comprises a probe tube or a long earplug, wherein one end of the probe tube or the long earplug is connected to the third transducer, and the other end of the probe tube or the long earplug is at least placed at an opening of the ear canal and at most placed at a vicinity of a tympanic membrane (e.g., 1 mm or closer), wherein the closer the other end is to the tympanic membrane, the more accurate the high-frequency audio quality obtained.

In another embodiment, one end of the probe tube or the long earplug is connected to the third transducer, and the other end of the probe tube or the long earplug is placed at a first curve path of an external auditory meatus or at a distance of about a few millimeters (e.g., 5 mm) from the tympanic membrane, etc., such that the obtained high-frequency audio quality is more precise than conventional technology.

In one embodiment, the third compensation module further quantizes the deviation to generate another set of filter parameters via the third compensation gain conversion model when the deviation still does not conform with the deviation target, so that the another set of filter parameters gain compensates the fourth electrical signal in each of the frequencies.

In one embodiment, the electronic device comprises a wireless or wired communication module, wherein the wireless or wired communication module transmits a test signal of the electronic device to the wireless or wired transceiver module via the wireless or wired transmission network to perform gain compensation in each of the frequencies.

In another embodiment, the electronic device comprises a speaker module, wherein the speaker module transmits a test signal of the electronic device to the first transducer through air to perform gain compensation in each of the frequencies.

In one embodiment, an optimal filter parameter value is generated by the compensation module according to the real-time customized earphone device obtained by the user in the current real environment that automatically searches for a plurality of sets of parameters of a plurality of filters via noise cancellation technology combined with optimization method and loss function, wherein the optimal filter parameter value is used as the original filter parameter.

In one embodiment, the electronic device stores an original filter parameter or the second filter parameter in a device with audio processing capability, wherein the device has a fourth compensation module for gain compensation.

In one embodiment, the earphone device is arranged in an earphone equipment with active noise cancellation, and the earphone device compensation method is applied to the earphone device, and the earphone device does not need the assistance of professionals; in another embodiment, the earphone device compensation method is implemented in the earphone equipment with active noise cancellation.

In one embodiment, the earphone device and the earphone device compensation method perform automatic, real-time and/or synchronous processing in combination of the compensation module of the earphone device with the compensation gain conversion model and wireless or wired communication technology.

In one embodiment, greatly reduce the dimensions that need to be adjusted via the compensation gain conversion model to quickly and accurately set the filter coefficients Based on the above, the present disclosure provides the earphone device and the compensation method thereof that do not need a real-ear analyzer, a probe transducer (i.e., a probe microphone), do not need to be limited to a professional hearing space for conducting the real-ear measurement analysis and do not need the assistance of professionals for effectively solving the abovementioned problems and for effectively reducing the power consumption and the latency of the DSP chip, and the present disclosure can perform the gain compensation and real-ear measurement to the user's personal earphone device in each frequency via wireless or wired communication technology in the current real environment to provide accurate, real-time, automated and customized earphone devices, and greatly reduce the dimensions that need to be adjusted to quickly and accurately set filter coefficients.

BRIEF DESCRIPTION OF THE DRAWINGS

FIG. 2-1, FIG. 2-2, FIG. 2-3 are schematic diagrams showing the earphone device combining with a smart device according to an embodiment of the present disclosure.

FIG. 3 is a schematic diagram illustrating a model training of a compensation gain conversion model according to an embodiment of the present disclosure.

DETAILED DESCRIPTION

Figure 1:
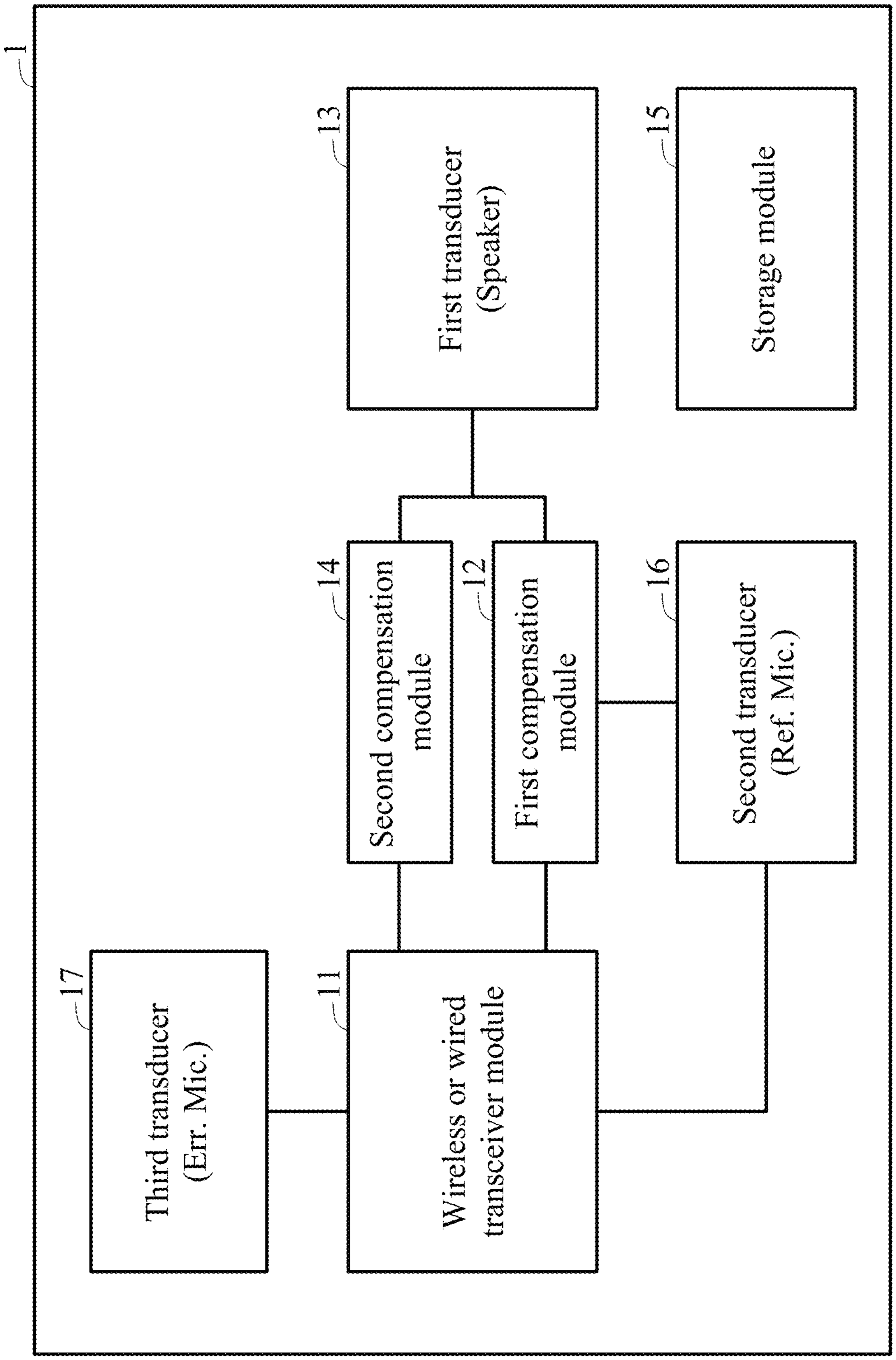
FIG. 1 is a schematic block diagram showing an earphone device according to the present disclosure.

Implementations of the present disclosure are described below by embodiments. Other advantages and technical effects of the present disclosure can be readily understood by one of ordinary skill in the art upon reading the disclosure of this specification.

It should be noted that the structures, ratios, sizes shown in the drawings appended to this specification are provided in conjunction with the disclosure of this specification in order to facilitate understanding by those skilled in the art. They are not meant, in any ways, to limit the implementations of the present disclosure, and therefore have no substantial technical meaning. Without influencing the effects created and objectives achieved by the present disclosure, any modifications, changes or adjustments to the structures, ratios or sizes are construed as falling within the scope covered by the technical contents disclosed herein.

FIG. 1 is a schematic block diagram showing an earphone device according to the present disclosure. In an embodiment, as shown in FIG. 1, an earphone device 1 of the present disclosure comprises a wireless or wired transceiver module (e.g., a wireless or wired transmitting and receiving module) 11, a first compensation module 12, a first transducer (i.e., a speaker) 13, a second compensation module 14, a storage module 15, a second transducer (Ref. Mic) 16 and a third transducer (Err. Mic) 17, wherein the wireless or wired transceiver module 11 receives a signal S from an electronic device (such as a smart device or a mobile device) via a wireless or wired transmission network (not shown) to convert the signal S into an electrical signal; the first compensation module 12 is connected to the wireless or wired transceiver module 11, and arranged in a streaming audio gain compensating filter (e.g., S(z) filter) (not shown) of an active noise cancellation chip, wherein the first compensation module 12 is used for implementing the frequency response curve, so as to calculate a frequency response of the electrical signal in each frequency band and generate a first filter parameter of the target frequency response curve by a first compensation gain conversion model, and the first filter parameter gain compensates the electrical signal in each frequency, wherein the first transducer 13 is connected to the first compensation module 12 and/or the wireless or wired transceiver module 11, so that when enabling a compensation function, converts the gain-compensated electrical signal into sound, and transmits the sound into the ear canal, and when disabling the compensation function, directly converts the first electrical signal into sound, and transmits the sound into the ear canal. In one embodiment, a cable is used for the wired transmission network.

Furthermore, as shown in FIG. 1, the second compensation module 14 is connected to the wireless or wired transceiver module 11, and is arranged in a transparency audio gain compensating filter (e.g., an APT filter) (not shown) of the active noise cancellation chip, wherein the second compensation module 14 is used for implementing the voice gain compensation, so as to calculate a gain of another electrical signal in each frequency band and generate a second filter parameter via a second compensation gain conversion model, so that the second filter parameter gain compensates the another electrical signal in each of the frequencies.

In one embodiment, the first compensation module 12 and the second compensation module 14 realize the abovementioned content when the compensation function is enabled, and directly convert the electrical signal into sound when the compensation function is disabled, so as to transmit the sound.

In one embodiment, the target frequency response curve may be a Harman frequency response curve, an Etymotic frequency response curve, a head-related transfer function (HRTF) frequency response curve, or other target frequency response curves, and the present disclosure is not limited to as such.

In one embodiment, the first filter parameter is a filter parameter of the gain compensation in each frequency of active noise cancellation, and the filter parameter of the gain compensation in each frequency of active noise cancellation is a parameter of a gain compensation filter unit (for example, S(z) filter or APT filter) in each frequency of the audio.

As shown in FIG. 1, the earphone device 1 of the present disclosure further comprises the storage module 15, and the first compensation module 12 uses an algorithm (or a compensation gain conversion model) or a firmware thereof to store the set of filter parameters in the storage module 15.

Figures 1, 2:
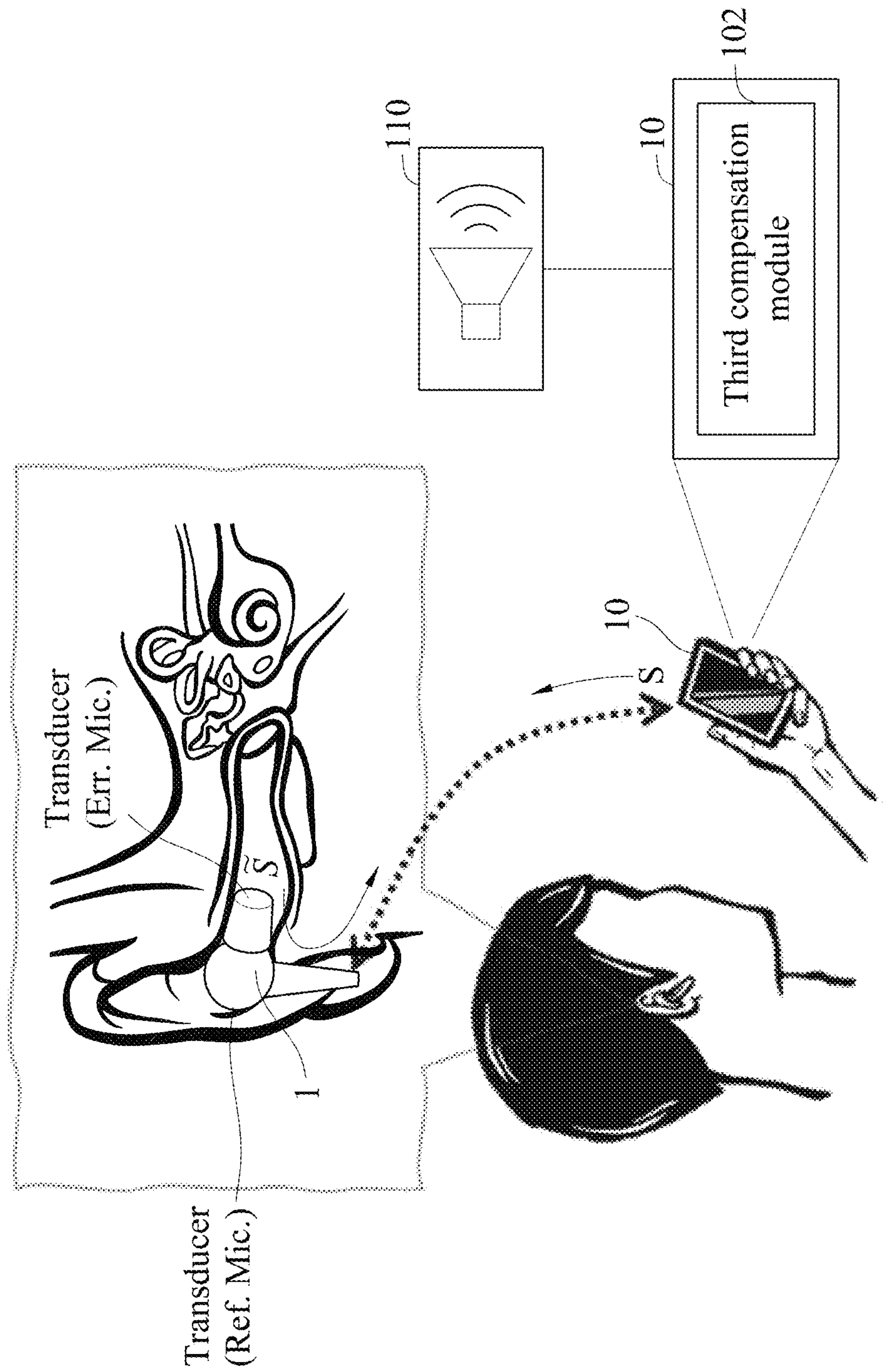
Figure 2:
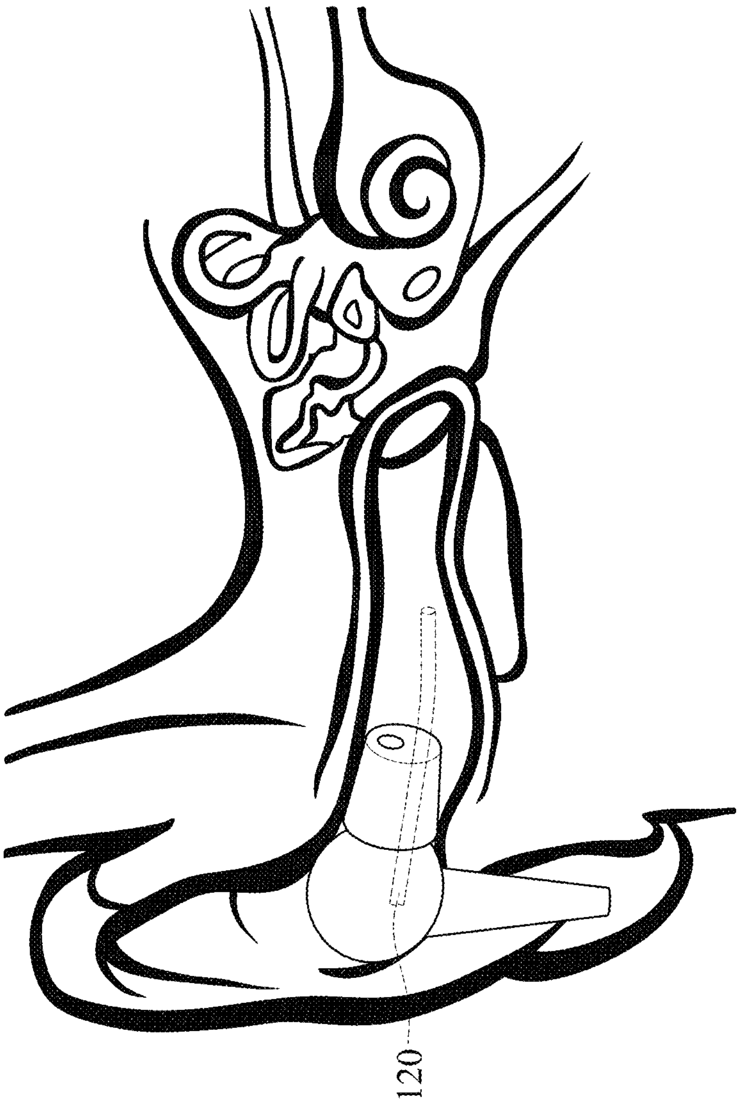

In another embodiment, as shown in FIG. 1 and FIG. 2-1, the present disclosure performs a real-ear measurement via the wireless or wired transceiver module 11, the first compensation module 12, the first transducer (speaker) 13, the second transducer (Ref. Mic.) 16, the third transducer (Err. Mic.) 17 and an electronic device 10. For instance, the wireless or wired transceiver module 11 receives the first test signal from the electronic device 10 via the wireless or wired transmission network to convert the first test signal into a first electrical signal; the third transducer (Err. Mic.) 17 is connected to the wireless or wired transceiver module 11 to synchronously convert the sound transmitted in the ear canal into a second electrical signal, so as to transmit the second electrical signal to the electronic device 10 via the wireless or wired transmission network, wherein the electronic device 10 receives the second electrical signal from the third transducer (Err. Mic.) 17 via the wireless or wired transmission network, wherein the third compensation module 102 calculates the frequency response of the second electrical signal in each frequency band to obtain/compare a deviation/error between the frequency response and the target frequency response curve, wherein if the deviation does not conform with a deviation target, the electronic device 10 quantizes/quantifies the deviation to generate a third filter parameter via a third compensation gain conversion model, wherein the third filter parameter gain compensates the second electrical signal in each frequency so that the third filter parameter is transmitted to the first compensation module via the wireless or wired transmission network for gain compensation.

In another embodiment, as shown in FIG. 1 and FIG. 2-1, the second transducer (Ref. Mic.) 16 of the earphone device 1 of the present disclosure can also receive a test signal S from the speaker module of the electronic device 10 (such as a smart device or a mobile device) through the air. Similar to the above-mentioned embodiment, if the second transducer (Ref. Mic.) 16 receives the test signal S from the speaker module of the electronic device 10 through the air, the first compensation module 12 performs gain compensation on the test signal S; the first transducer (speaker) 13 is connected to the first compensation module 12, and converts the gain-compensated test signal into sound, so as to transmit the sound to the ear canal; the third transducer (Err. Mic) 17 synchronously converts the sound transmitted in the ear canal into an electrical signal, so as to transmit the electrical signal to the electronic device 10 via the wireless or wired transceiver module 11 and the wireless or wired transmission network, wherein the electronic device 10 uses an application program (APP), a firmware thereof, or cloud technology to calculate the frequency response of the electrical signal in each frequency band, so as to compares a deviation between the frequency response and the target frequency response curve via a third compensation module 102, wherein if the deviation does not conform with the deviation target, the electronic device 10 quantizes the deviation by using the application program, a firmware thereof, or cloud technology, generates a set of filter parameters via the compensation gain conversion model, and then transmits the set of filter parameters to the first compensation module 12, the third compensation module 102 or other equipment or devices with audio processing capability (or compensation module) via the wireless or wired transmission network and the wireless or wired transceiver module 11 to perform gain compensation in each frequency.

Furthermore, the electronic device can store the original filter parameters or the above-mentioned filter parameters in a device or equipment with audio processing capability, wherein the device or equipment has a fourth compensation module for performing gain compensation. In one embodiment, the device or equipment with audio processing capability can select the original filter parameters or the above-mentioned filter parameters to perform gain compensation via a compensation module to personalize and improve the listening experience.

In addition, in one embodiment, if the deviation still not conform with the deviation target, the first compensation module uses an algorithm or a firmware thereof to further quantize the deviation, so as to generate another set of modified/corrected filter parameters via the compensation gain conversion model, so that the another set of modified filter parameters gain compensates the electrical signal in each frequency, wherein the compensation gain conversion model can be set in the earphone device, the smart device, the cloud, or the server, and the present disclosure is not limited to as such.

In one embodiment, the first compensation module 12 and the second compensation module 14 are arranged in the active noise cancellation chip, and the third compensation module 102 is arranged in the electronic device 10 (e.g., a smart device or a mobile device), wherein the first compensation module 12, the second compensation module 14 and the third compensation module 102 can be implemented by the application program, a firmware thereof, or cloud technology, wherein the first compensation module 12 is synchronized with the third compensation module 102.

In another embodiment, the set of filter parameters is the gain-compensated filter parameters of active noise cancellation, wherein the gain-compensated filter parameters of active noise cancellation are audio gain-compensated filter unit (e.g., S(z) or APT filter) parameters.

In an embodiment, the earphone device of the present disclosure is arranged in an earphone equipment with an active noise cancellation.

In addition, the above modules can be hardware or firmware; if it is hardware, it can implement various circuits for gain compensation in each frequency, wireless or wired transmitting and receiving, and storage, or hardware units with similar technology; if it is firmware, then it can be various firmware units that perform gain compensation in each frequency, wireless or wired transmitting and receiving, and storage. In one embodiment, the compensation module may be a gain compensation circuit or a gain compensation hardware/firmware unit, the wireless or wired transceiver module may be a wireless or wired transmitting and receiving circuit or a wireless or wired transmitting and receiving hardware/firmware unit, and the storage module may be a storage circuit or storage hardware/firmware unit, wherein the earphone device of the present disclosure comprises but not limited to ANC.

The earphone device of the present disclosure is free from requiring to use an additional probe transducer (i.e., a probe microphone), so as to provide accurate, real-time, automated and customized earphone devices via algorithms and wireless or wired communication technology in the current real environment.

Figures 2, 3:
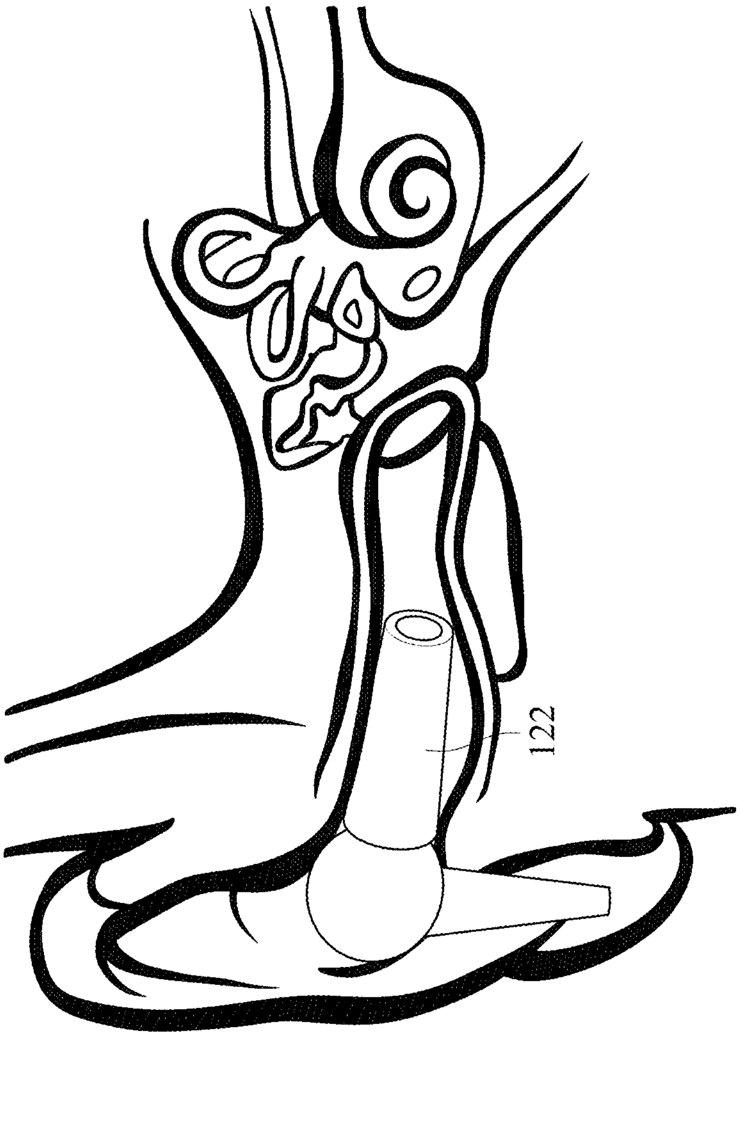
Figure 3:
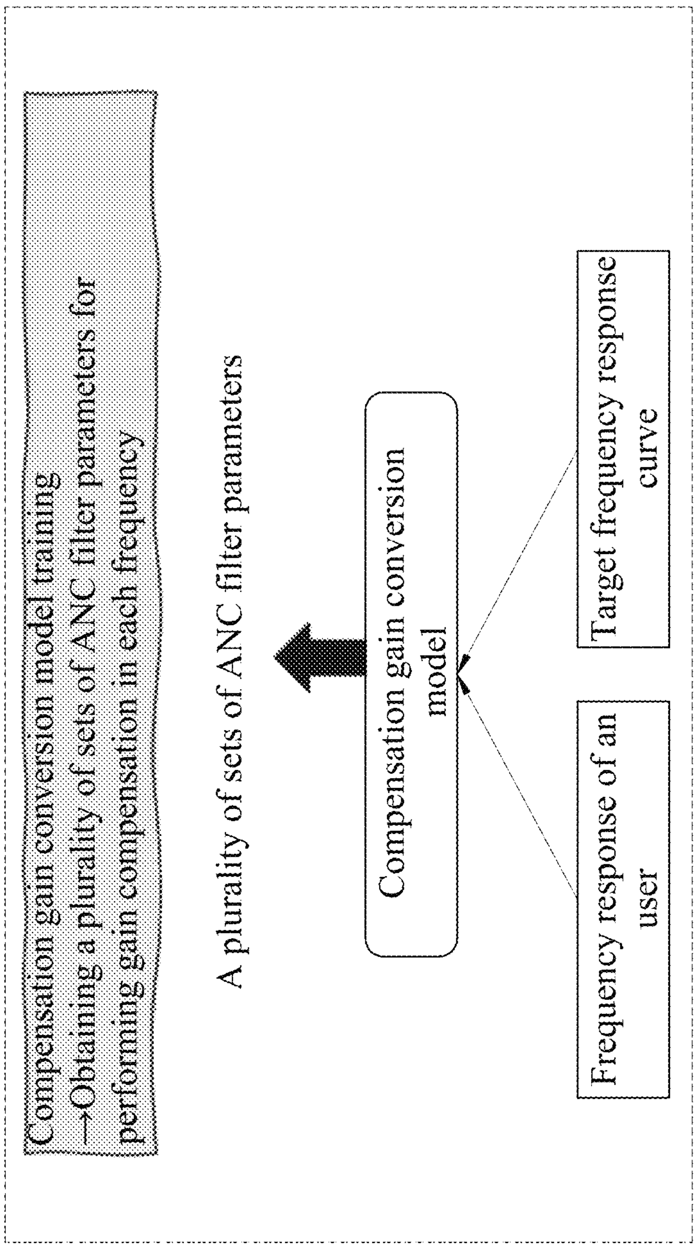

In another embodiment, as shown in FIG. 2-2 and FIG. 2-3, the earphone device of the present disclosure can also use a probe tube 120 or a long earplug 122, wherein one end of the probe tube 120 or the long earplug 122 is connected to the transducer (Err. Mic.), and the other end of the probe tube 120 or the long earplug 122 is at least placed at the opening of the ear canal and at most placed at the vicinity of the tympanic membrane (e.g., 1 mm or closer), wherein the closer the other end is to the tympanic membrane, the more accurate the high-frequency audio quality obtained, so as to provide an accurate, real-time, automated and customized earphone device via wireless or wired communication technology in the current real environment.

In another embodiment, one end of the probe tube or the long earplug is connected to the transducer (Err. Mic), and the other end of the probe tube or the long earplug is placed at a first curved path of the external auditory meatus or at a distance of about a few millimeters (e.g., 5 mm) from the tympanic membrane, etc., such that the obtained high-frequency audio quality is more precise than conventional technology.

It should be noted that FIG. 2-2 and FIG. 2-3 are schematic illustrations, and the present disclosure is not limited to as such.

FIG. 3 is a schematic diagram illustrating a model training of a compensation gain conversion model. In one embodiment, the compensation gain conversion model automatically generates a plurality of sets (or n sets) of ANC filter parameters via model training according to a frequency response characteristics of the electrical signal S̃, and the plurality of sets of ANC filter parameters can be provided to the ANC earphones for gain compensation in each frequency.

The following is a detailed description of the calculation of the frequency response of the electrical signal S̃ and the calculation of the gain compensation parameters via the compensation gain conversion model framework.

Calculation of Frequency Response of Electrical Signal S̃

Figure 4:
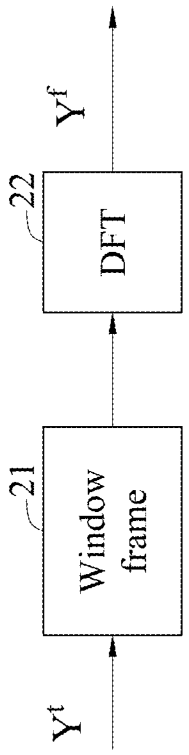
FIG. 4 is a schematic diagram illustrating a log-power spectrum (LPS) extraction method according to an embodiment of the present disclosure.

FIG. 4 is a schematic diagram illustrating a log-power spectrum (LPS) extraction method. In an embodiment, the transducer (Err. Mic) first transmits the received electrical signal S̃ to the APP for acoustic feature extraction, and uses a log-power spectrum (LPS) method to calculate the frequency response in the electrical signal S over a period of time. When extracting the feature, a short-time Fourier transform (STFT) is performed on the input signal by calculating the discrete Fourier transform (DFT) of each overlapping window frame 21 (e.g., the operation of the discrete Fourier transform is denoted by reference number 22 as shown in FIG. 4), that is, a music signal is converted from the time domain to the frequency domain via the formula (1), and the formula (1) is presented as follows:

$$Y^f(k)=\Sigma_{l=0}^{L-1}Y^t(l)h(l)e^{-j2\pi kl/L} \quad (1)$$

k=0, 1, . . . , L−1 wherein $Y^t(l)$ represents the l-th sample of the input signal (i.e., the electrical signal S̃) in the time domain, $Y^f(k)$ represents the frequency spectrum of the input signal, k is the frequency index, and h(l) represents the Hamming window function.

Figure 5:
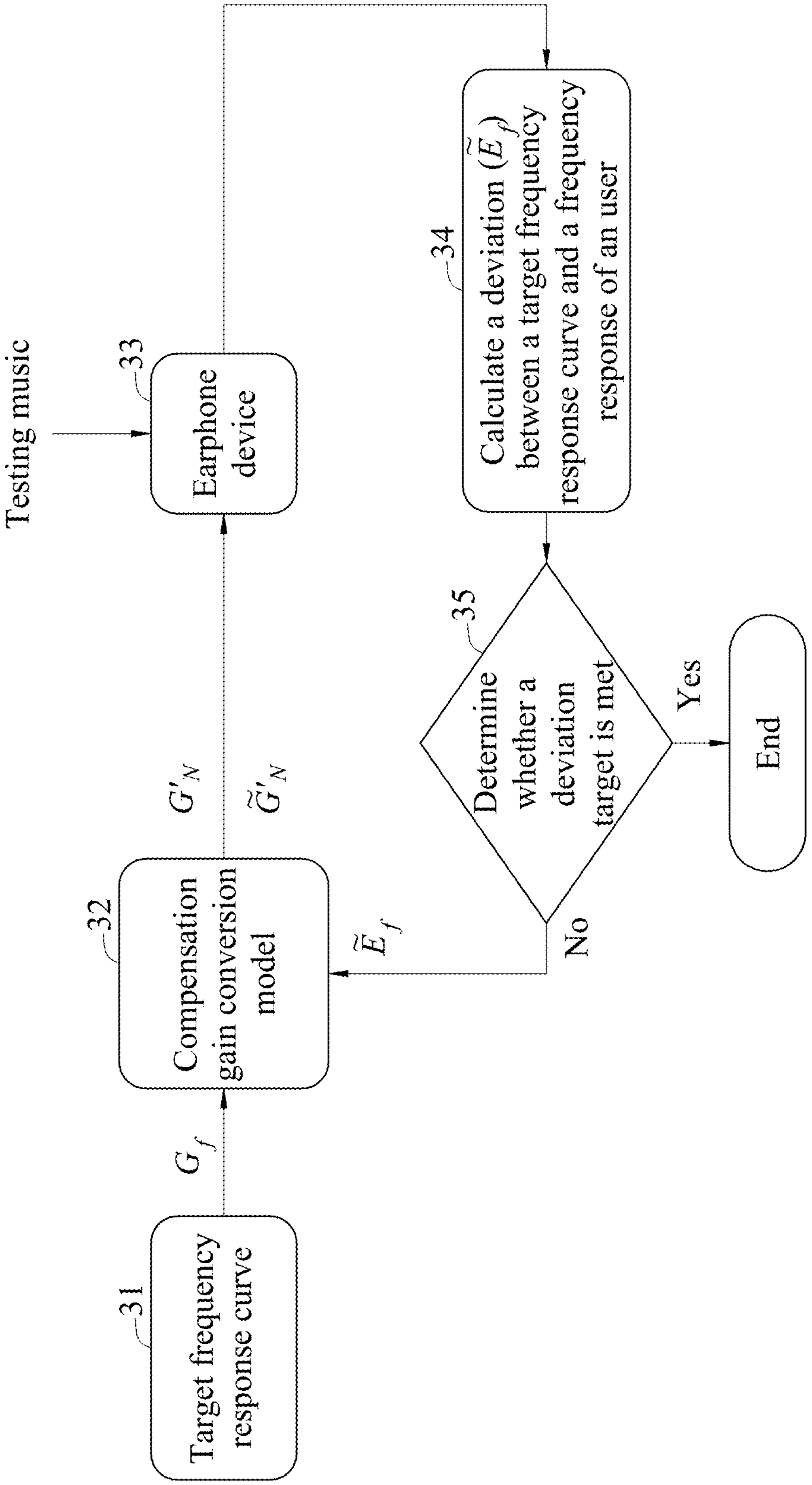
FIG. 5 is a schematic block diagram illustrating a model training of a compensation gain conversion model according to an embodiment of the present disclosure.

Performing Compensation Gain Parameters Via Compensation Gain Conversion Model Framework FIG. 5 is a schematic block diagram illustrating a model training of a compensation gain conversion model. As shown in FIG. 5, a target frequency response curve 31 is provided to a compensation gain conversion model 32, and then the compensation is converted into the filter parameter gain $G'_N$ required by the circuit via the compensation gain conversion model 32 (e.g., artificial intelligence algorithm, deep learning method, machine learning method, mathematical statistics method, etc.), and the filter parameter gain G'N is sent to an ANC earphone device 33. The abovementioned processes can be model trained via the compensation gain conversion model framework, and can be implemented by the target cost function as shown in formula (2):

$$L(\varphi_{NN}) = \frac{1}{M}\sum_{i=1}^{M}\left(G'_{i,N} - G_{i,f}\right)^2 \quad (2)$$

wherein N represents a plurality of sets (e.g., N sets) of filter parameters generated by the model, M represents the number of samples for model training, and i represents the i-th gain data in training.

When the compensation gain conversion model is being model trained, the deviation is back-propagated to update the model parameters, and the parameter weights are adjusted to find the best compensation, as shown in formula (3):

$$\varphi'_{NN} = \underset{\varphi}{\operatorname{argmin}}(L(\varphi_{NN})) \quad (3)$$

Then, the frequency response of a recorded electrical signal $\tilde{S}_f$ in the ear canal and the target frequency response curve are calculated via the transducer of the ANC device to obtain the deviation $\tilde{E}_f$ between the two (e.g., the operation of calculating the deviation $\tilde{E}_f$ between the target frequency response curve and the user's frequency response is denoted by reference number 34 as shown in FIG. 5), wherein the method of calculating the deviation includes the following methods: minimum mean-square error, and objective evaluation index (for example, HASQI, HASPI, STOI, NCM, PESQ, etc.), but the present disclosure is not limited to as such. And then, a determination/judgment is made to determine whether the current deviation is within an acceptable range (e.g., the operation of determining whether the current deviation meets the deviation target is denoted by reference number 35 as shown in FIG. 5). If the deviation $\tilde{E}_f$ is within an acceptable range, it means the selection/matching is completed; otherwise, this deviation $\tilde{E}_f$ is sent to the compensation gain conversion model again to regenerate another set of modified compensation gains $\tilde{G}'_N$. After the above process, the above process can be repeated to make the deviation $\tilde{E}_f$ continue to converge to conform with the required setting, so as to complete the automatic process.

Figure 6:
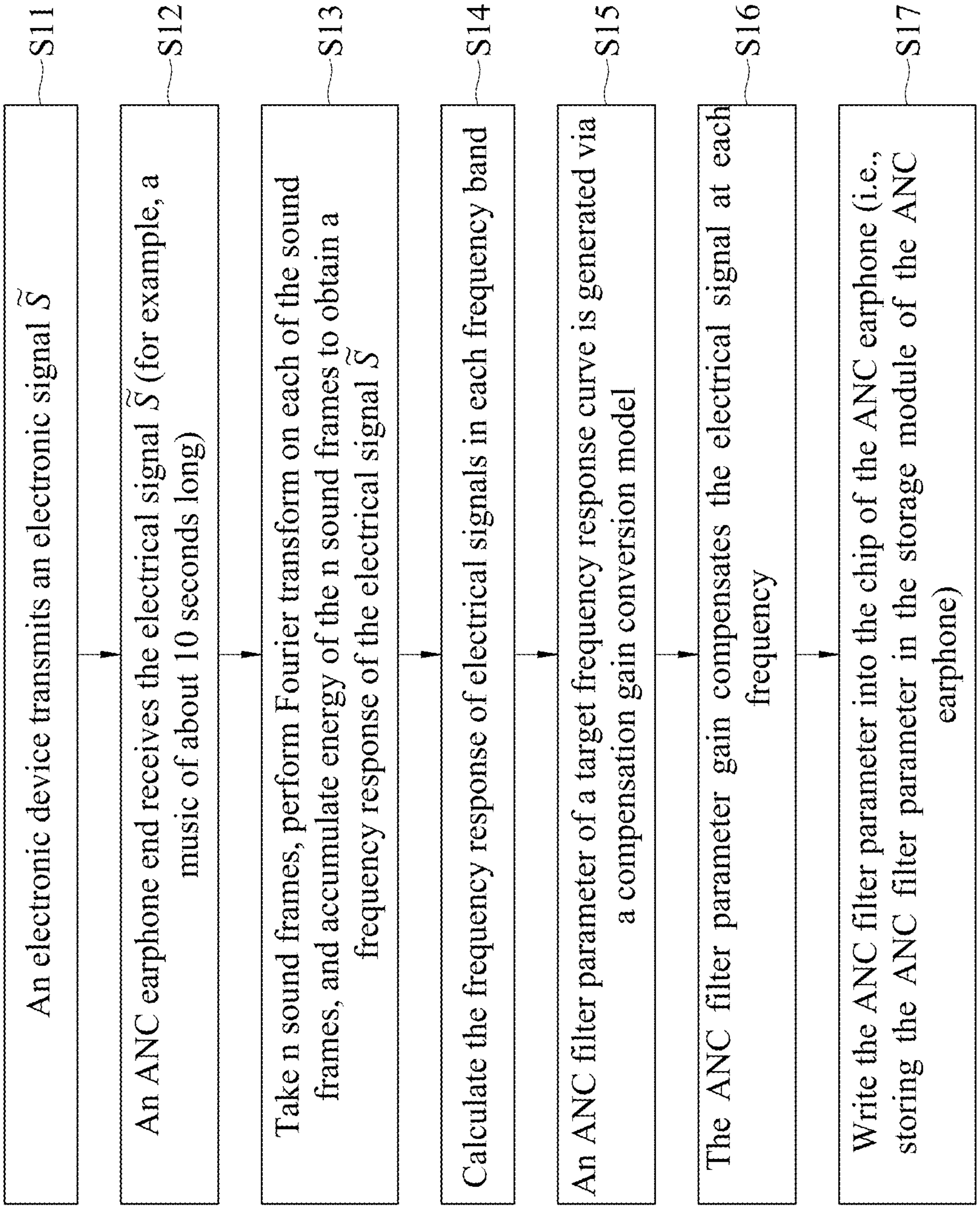
FIG. 6 is a flow chart showing the steps of an application program after receiving an electrical signal $\tilde{S}$ according to the present disclosure.

FIG. 6 is a flow chart showing the steps of the ANC earphone end after receiving an electrical signal S̃ according to the present disclosure. As shown in FIG. 6, in step S11, the electronic device transmits the electrical signal S̃.

In step S12, the ANC earphone end receives the electrical signal S̃ (for example, a music of about 10 seconds long).

In step S13, take n sound frames, perform Fourier transform on each of the sound frames, and accumulate the energy of the n sound frames to obtain the frequency response of the electrical signal $\tilde{S}$.

In step S14, calculate the frequency response of electrical signals in each frequency band.

In step S15, the ANC filter parameter of the target frequency response curve is generated via the compensation gain conversion model.

In step S16, the ANC filter parameter gain compensates the electrical signal at each frequency.

In step S17, the ANC filter parameters are written into the chip of the ANC earphone (i.e., storing the ANC filter parameters in the storage module of the ANC earphone).

It is worth mentioning that the earphone device of the present disclosure adopts active noise cancellation (ANC) technology, but in different embodiments, the same or similar noise cancellation technology can be applied, and the present disclosure is not limited to as such. In an embodiment, the filter (e.g., FF, FB, SZ, APT, etc.) parameters can be set via the information/data of the "acoustic characteristics of the mechanism" and the "acoustic compensation prescription," that is, the filter parameters in the ANC technology are set by the mean-square error (MSE) method, so that the ANC technology can perform the gain compensation capability of different frequencies for the sound source transmitted by the transducer. In an embodiment, the above-mentioned filters may be feedforward (FF) filters, feedback (FB) filters, and audio gain compensation filter units (e.g., S(z) filters, APT filters), respectively, wherein the feedforward (FF) filter can receive an electrical signal of the transducer (Ref. Mic) to eliminate external noise; the feedback (FB) filter can receive an electrical signal of the transducer (Err. Mic) (i.e., the transducer (Err. Mic) converts the noise in the ear canal into an electrical signal) to eliminate the noise in the ear canal; and the audio gain compensation filter units (e.g., S(z) filters and APT filters) receive an appropriate target curve to properly adjust the electrical signal in each frequency band.

Since the present disclosure is suitable for various smart devices, the earphone device can perform gain compensation in each frequency without the assistance of professionals in the current environment (e.g., living room, outdoor, car, park, etc.).

It is worth mentioning that, besides performing gain compensation in each frequency, the earphone device of the present disclosure does not need to be in an audiometric testing room equipped with a real-ear measuring instrument for performing real-ear measurement analysis. The earphone device of the present disclosure can be used in the current real environment (e.g., not in the audiometric testing room) and can provide an accurate, real-time, automated and customized earphone device or hearing equipment.

In an embodiment, the earphone device of the present disclosure can be earphones (including but not limited to dynamic type, balanced armature type, piezoelectric type, pneumatic type, electrostatic type, wired transmission, wireless transmission earphones), hearing aids, anti-noise earphones, monitoring earphones, smart glasses, wearable devices, or a combination thereof. In another embodiment, the earphone device of the present disclosure can also be disposed and connected to a hearing equipment and having the abovementioned compensation technology.

In addition, the earphone device of the present disclosure can directly synchronize the user's real-time customized gain compensation to the noise cancellation module and/or compensation module arranged in the same or single chip by combining algorithms (e.g., compensation gain conversion model techniques) with wireless communication technology (e.g., Bluetooth, Wi-Fi, near-field communication [NFC], ultra-wideband [UWB], IEEE 802.15.4, and other wireless communication technologies) or wired communication technology (e.g., cable), so as to provide the user with a comfortable listening experience in real time. Furthermore, according to the above-mentioned embodiments of the present disclosure, since the user may use his/her own hearing device or earphone equipment (e.g., various smart devices or equipment cooperate with ANC earphones or TWS earphones) to perform gain compensation in each frequency in various current real environments or real application environments (i.e., quiet or noisy environment), the user can choose to turn on or off the noise cancellation module when using the compensation method of the earphone device of the present disclosure according to his/her own needs.

It should be noted that, the earphone device of the present disclosure does not need to be limited in an audiometric testing room when performing gain compensation in each frequency and does not require the assistance of professionals. The present disclosure also does not need to use an additional probe transducer, and the present disclosure can provide automated, real-time and customized earphone devices or hearing equipment only by the devices (e.g., earphones, hearing aids, auditory aids, etc.) and by smart devices combined with compensation gain conversion model technology and wireless or wired communication technology.

Figure 7A:
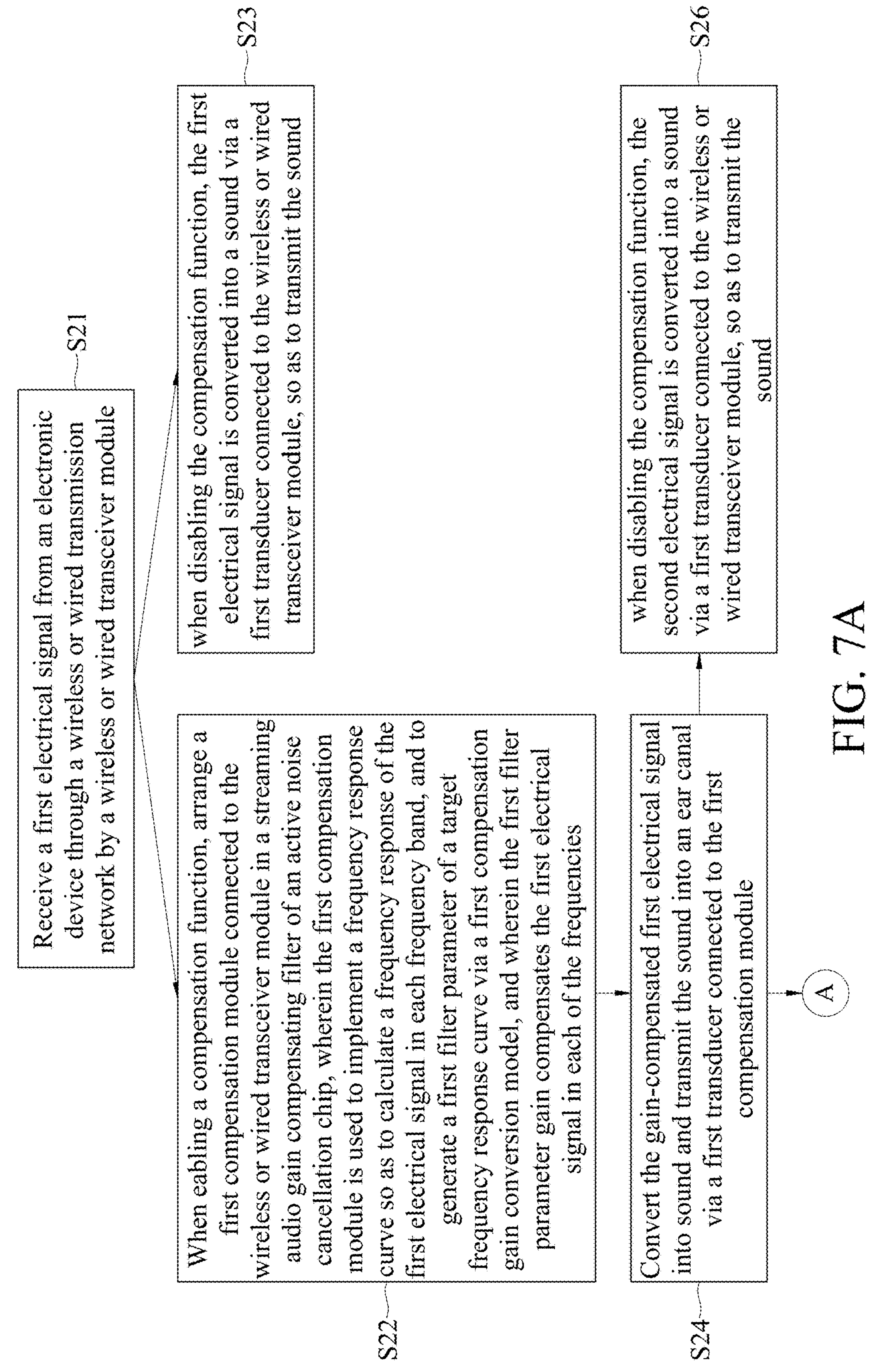
FIG. 7A and FIG. 7B are flow charts showing the steps of a compensation method of the earphone device according to the present disclosure.
Figure 7B:
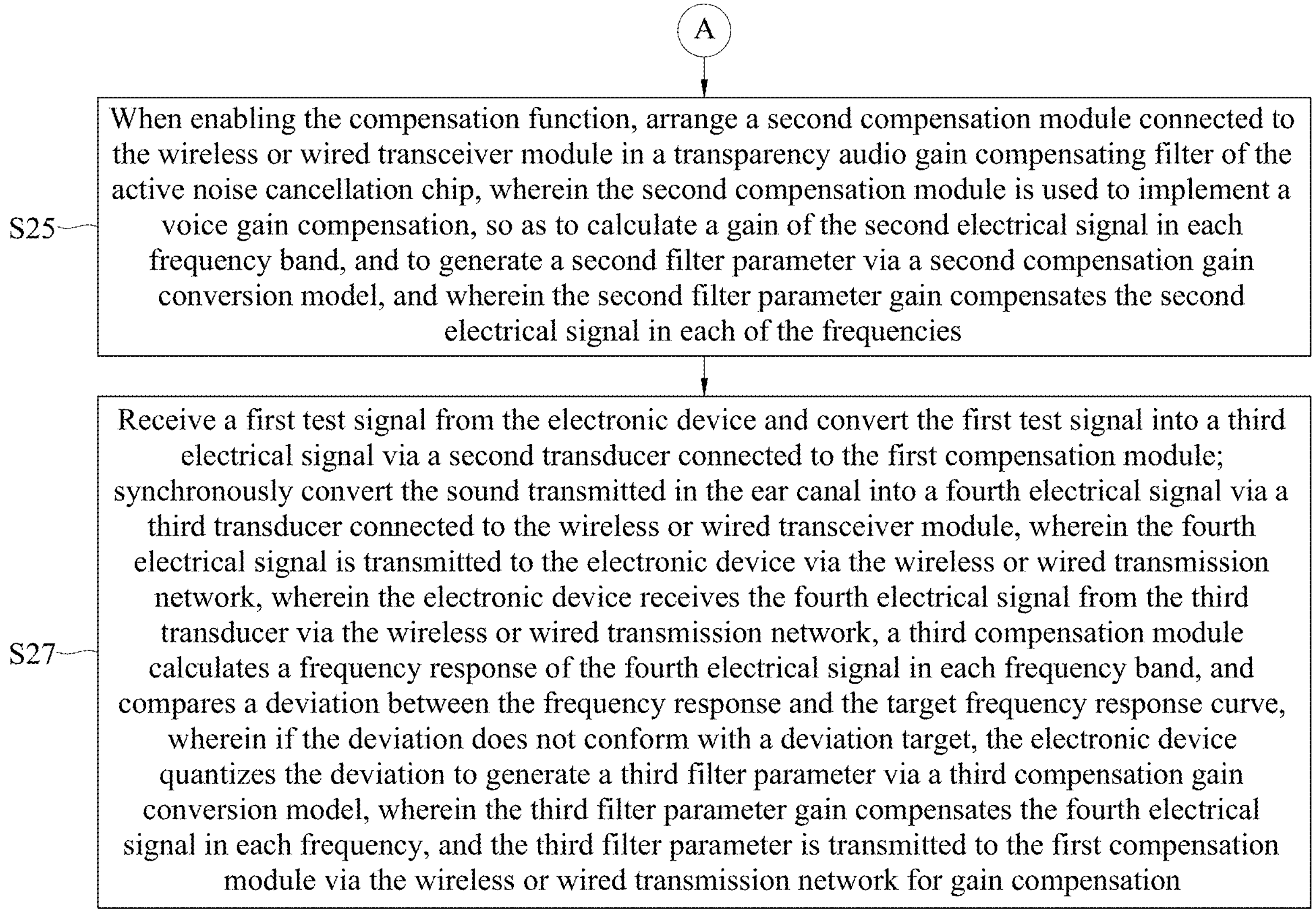

FIG. 7A and FIG. 7B are flow charts showing the steps of the compensation method of the earphone device according to the present disclosure, and FIG. 7A and FIG. 7B are illustrated in conjunction with the description of the above-mentioned embodiments, wherein the compensation method at least includes the following steps S21 to S27.

In step S21, a first electrical signal from an electronic device is received through a wireless or wired transmission network by a wireless or wired transceiver module.

In step S22, when enabling a compensation function, a first compensation module connected to the wireless or wired transceiver module is arranged in a streaming audio gain compensating filter of the active noise cancellation chip, wherein the first compensation module is used to implement a frequency response curve so as to calculate a frequency response of the first electrical signal in each frequency band, and to generate a first filter parameter of a target frequency response curve via a first compensation gain conversion model, so that the first filter parameter gain compensates the first electrical signal in each of the frequencies.

In step S24, the gain-compensated first electrical signal is converted into sound and the sound is transmitted into an ear canal via a first transducer connected to the first compensation module.

In step S25, when enabling a compensation function, a second compensation module connected to the wireless or wired transceiver module is arranged in a transparency audio gain compensating filter of the active noise cancellation chip, wherein the second compensation module is used to implement voice gain compensation, so as to calculate a gain of the second electrical signal in each frequency band, and to generate a second filter parameter via a second compensation gain conversion model, so that the second filter parameter gain compensates the second electrical signal in each of the frequencies.

In step S27, a first test signal from the electronic device is received and the first test signal is converted into a third electrical signal via a second transducer connected to the first compensation module; the sound transmitted in the ear canal is synchronously converted into a fourth electrical signal via a third transducer connected to the wireless or wired transceiver module, and the fourth electrical signal is transmitted to the electronic device via the wireless or wired transmission network, wherein the electronic device receives the fourth electrical signal from the third transducer via the wireless or wired transmission network, a third compensation module calculates a frequency response of the fourth electrical signal in each frequency band, and compares a deviation between the frequency response and the target frequency response curve, wherein if the deviation does not conform with a deviation target, the electronic device quantizes the deviation to generate a third filter parameter via a third compensation gain conversion model, wherein the third filter parameter gain compensates the fourth electrical signal in each frequency, and the third filter parameter is transmitted to the first compensation module via the wireless or wired transmission network for gain compensation.

In addition, in step S23, when disabling the compensation function, the first electrical signal is converted into a sound via a first transducer connected to the wireless or wired transceiver module, so as to transmit the sound.

Furthermore, in step S26, when disabling the compensation function, the second electrical signal is converted into a sound via a first transducer connected to the wireless or wired transceiver module, so as to transmit the sound.

In another embodiment, in addition to storing the set of filter parameters to the storage module, the electronic device can also use an algorithm (compensation gain conversion model), firmware thereof, or cloud technology to store the original filter parameters or the set of filter parameters to a device or an equipment with audio processing capability, wherein the device or equipment has a fourth compensation module for gain compensation.

Furthermore, in addition to the transducer (Ref. Mic.) receiving the first test signal from an electronic device (e.g., a smart device or a mobile device) via a wireless or wired transmission network and a wireless or wired transceiver module, a speaker module of the electronic device can also transmit the second test signal of the electronic device to the transducer (Ref. Mic.) through the air, so as to perform the aforementioned gain compensation. Further, the first test signal can be transmitted via wireless or wired communication, and the second test signal can be transmitted in the air.

In the abovementioned compensation method, the first compensation module and the second compensation can be arranged in the chip of active noise cancellation, and the third compensation module can be arranged in the electronic device (e.g., a smart device or a mobile device), wherein the first compensation module and the second compensation module can be implemented by the application program, firmware thereof, or cloud technology, wherein the first compensation module is synchronized with the third compensation module.

In an embodiment, the set of filter parameters is the gain compensation filter parameters of the active noise cancellation or the gain compensation parameters of a digital signal processing circuit, wherein the gain compensation filter parameters of the active noise cancellation are the audio gain compensation filter unit (e.g., S(z) filter or APT filter) parameters.

In addition, the aforementioned compensation method is implemented to the earphone device, and can also be implemented to the earphone equipment with active noise cancellation.

Furthermore, it should be noted that, the ANC technology has been gradually applied to TWS earphones in the audio processing chips, in which the reverse wave signals are generated by the hardware circuits and the corresponding system parameters, so as to achieve the function of active noise cancellation. Since the ANC technology can have extremely low delay time (<20 μs), the processing thereof with extremely high sampling rate is also used to solve the challenge of delay time in addition to the advantages of implementing by hardware circuits. Therefore, in the ANC technology framework, the present disclosure can appropriately provide correct filter parameters, and the circuit characteristics thereof can also be converted to be applied to the gain adjustment of the frequency response. In other words, the earphone device and the compensation method thereof of the present disclosure can effectively adjust the gain of the frequency response with the ANC technology, thereby achieving the advantages of high sampling rate and low power consumption of the ANC technology, thus effectively improving the audio quality processed by the audio processing chip and reducing power consumption.

In view of the above, the earphone device and the compensation method thereof of the present disclosure combine the active noise cancellation (ANC) technology with digital network technology and wireless or wired transmission technology, which not only enable the earphone to emit reverse waves (or forward waves) with the same energy as the current noise to eliminate the ambient noise in the ear canal, but also can directly perform gain compensation in each frequency, and can also directly perform gain compensation to the customized earphone device of the user in each frequency via the compensation module when performing real-ear measurement (REM) (so that the signal gain [such as forward signal and/or reverse signal] of each frequency band is properly adjusted), such that the effect of automation, real-time and customization of the user's earphone device or hearing equipment enables the user to hear clearer sound or better music with their earphone devices or hearing equipment.

Furthermore, the earphone device and the compensation method thereof of the present disclosure take the gain characteristics of the user's frequency response into consideration via the compensation gain conversion model technology, so as to provide testing music, perform real-ear measurement and achieve the effect of automation, real-time and customization of the user's earphone device or hearing equipment, so that the users can listen to clearer sound or better music with their earphone devices or hearing equipment.

In addition, in an embodiment, the compensation gain conversion model can also automatically modify the compensation parameters of the earphone device (e.g., compensation parameters such as speech intelligibility index SII, HASQI, HASPI, etc.), wherein the compensation gain conversion model can be arranged in the earphone device, smart device, cloud, or server, and the present disclosure is not limited to as such.

Furthermore, it is worth mentioning that the earphone device and the compensation method thereof are free from requiring to perform dynamic range compression function (DRCF).

In an embodiment, a computer program product is provided and uses the device's algorithm (compensation gain conversion model) or the firmware technology thereof to execute/implement the abovementioned method/process, and the computer program product can automatically store various filter parameters to a device or an equipment (as shown by an equipment/device 110 in FIG. 2-1, such as a smart device, a mobile device, a speaker, or a sound box) with audio processing capability, wherein the device or equipment has a compensation module to perform gain compensation in each frequency. Therefore, the computer program product can choose to synchronize the filter parameters to the earphone device or synchronize the filter parameters to the device or equipment with music processing capability for music processing and playing.

The above embodiments are provided for illustrating the principles of the present disclosure and its technical effect, and should not be construed as to limit the present disclosure in any way. The above embodiments can be modified by one of ordinary skill in the art without departing from the spirit and scope of the present disclosure. Therefore, the scope claimed of the present disclosure should be defined by the following claims.

What is claimed is:

1. An earphone device, comprising:

a wireless or wired transceiver module configured to receive a first electrical signal from an electronic device via a wireless or wired transmission network;

a first compensation module connected to the wireless or wired transceiver module and arranged in a streaming audio gain compensating filter of an active noise cancellation chip, wherein the first compensation module is used to implement a frequency response curve to calculate a frequency response of the first electrical signal in each frequency band, and to generate a first filter parameter of a target frequency response curve via a first compensation gain conversion model, and wherein the first filter parameter gain compensates the first electrical signal in each of the frequencies;

a first transducer connected to the first compensation module and/or the wireless or wired transceiver module, wherein the first transducer converts the gain-compensated first electrical signal into a sound when enabling a compensation function, so as to transmit the sound, and directly converts the first electrical signal into a sound when disabling the compensation function so as to transmit the sound;

a second transducer connected to the first compensation module, wherein the second transducer receives a first test signal from the electronic device and converts the first test signal into a third electrical signal; and a third transducer connected to the wireless or wired transceiver module, wherein the third transducer synchronously converts the transmitted sound into a fourth electrical signal, so as to transmit the fourth electrical signal to the electronic device via the wireless or wired transmission network, wherein the electronic device receives the fourth electrical signal from the third transducer via the wireless or wired transmission network, a third compensation module calculates a frequency response of the fourth electrical signal in each frequency band to compare a deviation between the frequency response and the target frequency response curve, wherein the electronic device quantizes the deviation to generate a third filter parameter via a third compensation gain conversion model when the deviation does not conform with a deviation target, and wherein the third filter parameter gain compensates the fourth electrical signal in each of the frequencies, so that the third filter parameter is transmitted to the first compensation module via the wireless or wired transmission network for gain compensation, and wherein the third compensation module further quantizes the deviation to generate another set of filter parameters via the third compensation gain conversion model when the deviation still does not conform with the deviation target, so that the another set of filter parameters gain compensates the fourth electrical signal in each of the frequencies.

2. The earphone device of claim 1, further comprising a second compensation module connected to the wireless or wired transceiver module and arranged in a transparency audio gain compensating filter of the active noise cancellation chip, wherein the second compensation module is used to implement a voice gain compensation to calculate a gain of a second electrical signal in each frequency band, and to generate a second filter parameter via a second compensation gain conversion model, so that the second filter parameter gain compensates the second electrical signal in each of the frequencies.

3. The earphone device of claim 1, wherein the target frequency response curve is a Harman frequency response curve, an Etymotic frequency response curve or a head-related transfer function frequency response curve.

4. The earphone device of claim 1, wherein the first filter parameter is a filter parameter of a gain compensation in each of the frequencies of active noise cancellation, and the first filter parameter of the gain compensation in each of the frequencies of active noise cancellation is an audio gain compensation filter unit parameter.

5. The earphone device of claim 1, further comprising a storage module, wherein the first compensation module stores the first filter parameter to the storage module.

6. The earphone device of claim 1, further comprising a probe tube or a long earplug, wherein one end of the probe tube or the long earplug is connected to the third transducer, and the other end of the probe tube or the long earplug is placed at a first curve path of an auditory meatus or at a distance of 5 mm from a tympanic membrane.

7. The earphone device of claim 1, wherein the electronic device comprises a wireless or wired communication module, wherein the wireless or wired communication module transmits a test signal of the electronic device to the wireless or wired transceiver module via the wireless or wired transmission network to perform gain compensation in each of the frequencies.

8. The earphone device of claim 1, wherein the electronic device comprises a speaker module, wherein the speaker module transmits a test signal of the electronic device to the first transducer through air to perform gain compensation in each of the frequencies.

9. The earphone device of claim 1, wherein the electronic device stores an original filter parameter or the second filter parameter in a device with audio processing capability, wherein the device has a fourth compensation module for gain compensation.

10. A compensation method of an earphone device, comprising:

receiving a first electrical signal from an electronic device via a wireless or wired transceiver module through a wireless or wired transmission network;

when enabling a compensation function arranging a first compensation module connected to the wireless or wired transceiver module in a streaming audio gain compensating filter of an active noise cancellation chip, wherein the first compensation module is used to implement a frequency response curve to calculate a frequency response of the first electrical signal in each frequency band, and to generate a first filter parameter of a target frequency response curve via a first compensation gain conversion model, so that the first filter parameter gain compensates the first electrical signal in each of the frequencies;

converting the gain-compensated first electrical signal into sound so as to transmit the sound via a first transducer connected to the first compensation module;

receiving a first test signal from the electronic device and converting the first test signal into a third electrical signal via a second transducer connected to the first compensation module; and synchronously converting the transmitted sound into a fourth electrical signal via a third transducer connected to the wireless or wired transceiver module, wherein the fourth electrical signal is transmitted to the electronic device via the wireless or wired transmission network, wherein the electronic device receives the fourth electrical signal from the third transducer via the wireless or wired transmission network, a third compensation module calculates a frequency response of the fourth electrical signal in each frequency band to compare a deviation between the frequency response and the target frequency response curve, wherein the electronic device quantizes the deviation to generate a third filter parameter via a third compensation gain conversion model when the deviation does not conform with a deviation target, and wherein the third filter parameter gain compensates the fourth electrical signal in each of the frequencies, such that the third filter parameter is transmitted to the first compensation module via the wireless or wired transmission network for gain compensation, wherein the third compensation module further quantizes the deviation to generate another set of filter parameters via the third compensation gain conversion model when the deviation still does not conform with the deviation target, so that the another set of filter parameters gain compensates the fourth electrical signal in each of the frequencies.

11. The compensation method of the earphone device of claim 10, wherein when disabling the compensation function, the first electrical signal is converted into a sound via a first transducer connected to the wireless or wired transceiver module, so as to transmit the sound.

12. The compensation method of the earphone device of claim 10, further comprising arranging a second compensation module connected to the wireless or wired transceiver module in a transparency audio gain compensating filter of the active noise cancellation chip, wherein the second compensation module is used to implement a voice gain compensation to calculate a gain of the second electrical signal in each frequency band, and to generate a second filter parameter via a second compensation gain conversion model, so that the second filter parameter gain compensates the second electrical signal in each of the frequencies.

13. The compensation method of the earphone device of claim 10, wherein the target frequency response curve is a Harman frequency response curve, an Etymotic frequency response curve, or a head-related transfer function frequency response curve.

14. The compensation method of the earphone device of claim 10, wherein the electronic device stores an original filter parameter or the second filter parameter in a device with audio processing capability, wherein the device has a fourth compensation module for gain compensation.

15. A non-transitory computer-readable medium encoded with a computer program implementing the compensation method of the earphone device of claim 10.

* * * * *